Dec. 22, 1970    J. W. MINK    3,549,236
OPTICAL FREQUENCY DISCRIMINATOR WITH DUAL FREQUENCY RESONATOR
Filed Sept. 30, 1968    2 Sheets-Sheet 1
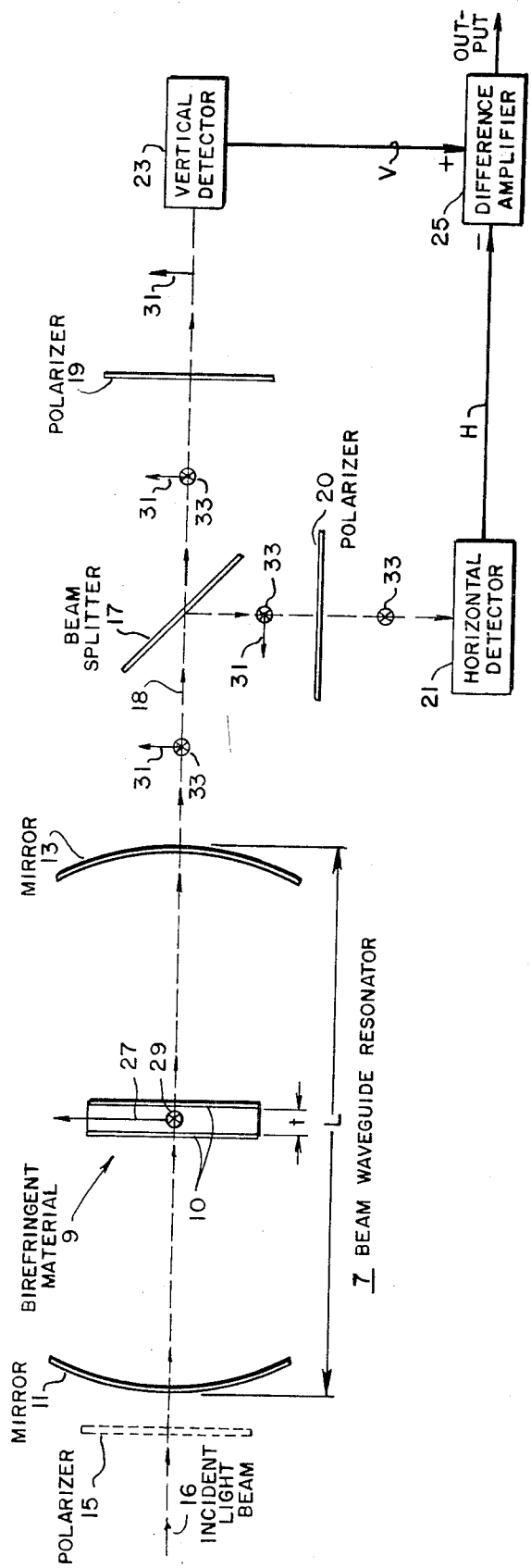
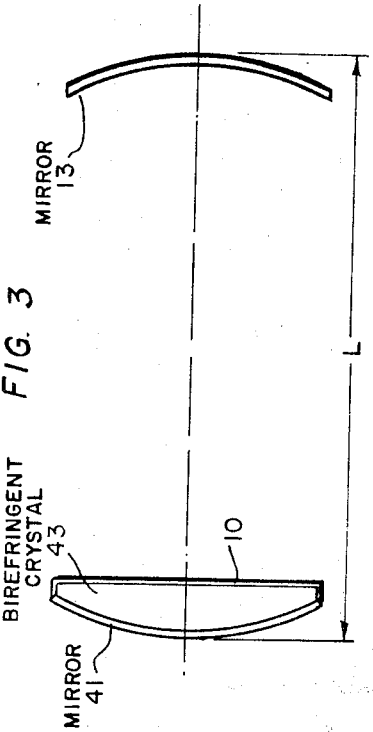
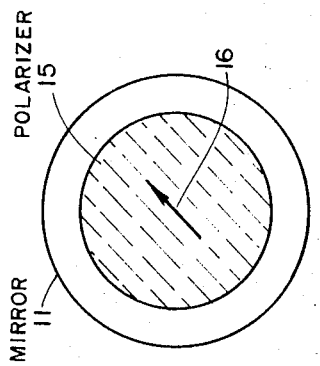
INVENTOR,
JAMES W. MINK.
BY: Gordon W. Kerr
Harry M. Saragovitz,
Edward J. Kelly &
Herbert Berl
ATTORNEYS.

Dec. 22, 1970   J. W. MINK   3,549,236
OPTICAL FREQUENCY DISCRIMINATOR WITH DUAL FREQUENCY RESONATOR
Filed Sept. 30, 1968   2 Sheets-Sheet 2

INVENTOR,
JAMES W. MINK.
ATTORNEYS.

United States Patent Office 3,549,236
Patented Dec. 22, 1970

---

3,549,236
OPTICAL FREQUENCY DISCRIMINATOR WITH DUAL FREQUENCY RESONATOR
James W. Mink, Neptune, N.J., assignor to the United States of America as represented by the Secretary of the Army
Filed Sept. 30, 1968, Ser. No. 763,692
Int. Cl. G02f 1/24
U.S. Cl. 350—157        6 Claims

ABSTRACT OF THE DISCLOSURE

The resonator comprises a pair of confronting spherical mirrors with birefringent material between them. This structure results in two resonant frequencies within the resonator which must be excited with orthogonally polarized light beams. The input light beam is arranged to excite each of the resonant modes equally, and a beam splitter and a pair of polarizers separate the responses of the resonator at the two resonant modes. One of such responses is subtracted from the other to form the discriminator S-curve.

---

The invention described herein may be manufactured, used and licensed by or for the Government for governmental purposes without the payment to me of any royalty thereon.

This invention relates to a novel and useful frequency discriminator or detector for use in the optical portion of the spectrum. The advent of single mode lasers with high degrees of spatial and temporal coherence and which are substantially monochromatic has created a need for improved means for accurately and easily measuring optical frequencies. The present invention fulfills this need and may also be used for demodulation of frequency modulated laser signals, for stability measurements and in automatic frequency control circuits, thus bringing many microwave techniques into the optical portion of the spectrum.

Briefly stated, the invention utilizes a single optical resonator of the beam waveguide type which possesses two resonant frequencies or modes in orthogonal directions therein. The two modes are equally excited in the resonator by the input light beam of unknown frequency and thus the relative magnitudes of the two orthogonal modes in the resonator output is a measure of the unknown frequency relative to the two frequency response curves of the resonator. The two modes are separated, converted to electrical signals and one subtracted from the other to form the well-known discriminator S-curve. The two modes within the resonator are made possible by the presence of a birefringent material therein. The use of a single dual-mode resonator rather than two differently-tuned resonators has important advantages, as will appear from the succeeding discussion. Also, a voltage may be applied to the birefringent material to alter the characteristics thereof.

It is thus an object of the invention to provide an improved optical frequency discriminator.

Another object of the invention is to provide an improved optical frequency discriminator including a single optical resonator having dual modes or resonant frequencies.

Another object of the invention is to provide an optical frequency discriminator including a single optical resonator in which dual resonant frequencies result from the presence of a birefringent material therein.

These and other objects and advantages of the invention will become apparent from the following detailed description and drawings, in which:

FIG. 1 is a schematic diagram of an illustrative embodiment of the invention;

FIG. 2 is an end view of the resonator 7 of FIG. 1;

FIG. 3 is a modification of the beam waveguide resonator of FIG. 1;

Figure 4:
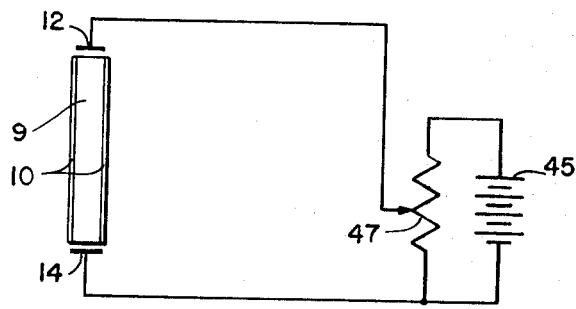
FIG. 4 is a modification of the birefringent material 9 of the resonator 7 of FIG. 1.

The basic principle of the discriminator of the present invention has been used in the prior art at lower frequencies and with separate cavity resonators or tank circuits of different resonant frequency. This basic principle involves the equal excitation of the resonators or tank circuits by the unknown input frequency. The output of each resonant circuit will depend on where the input frequency falls relative to the resonant circuit frequency response curves, and the two outputs are separated detected and their relative amplitudes compared to yield the familiar discriminator S-curves. The present invention extends this principle to optical wavelengths and in addition utilizes the property of birefringence to combine both resonant circuits to the same optical resonator. Further, by applying an electric field to the birefringent material perpendicular to the direction of propagation therein, an electro-optic effect is produced which makes it possible to vary the tuning of the discriminator.

In FIG. 1, the beam waveguide resonator 7 is a form of optical resonant cavity which is similar to a laser cavity and also somewhat analogous in its operation to a microwave cavity. The resonator is formed by two confronting partially transparent spherical mirrors 11 and 13, which are spaced apart by a distance L. The mirrors have high reflectivity so that the optical energy may bounce back and forth between them with a minimum of loss, but have sufficient transparency so that the incident light beam 16 can enter through mirror 11 and the output beam 18 can exit through mirror 13. The mirrors are thus similar to the output mirrors of a laser. The curved mirrors aid in preventing leakage of the light from the open sides of the resonator. Positioned within the resonator 7 is a birefringent material 9, which may be crystalline, such as quartz, KDP, ADP or calcite. Such materials have the property that the index of refraction (and hence the velocity of propagation) along one axis, called the ordinary axis, is different from that along another axis called the extraordinary axis, which is orthogonal or at right angles thereto. This difference in propagational velocity within the crystal 9 makes the resonator 7 appear electrically longer along one of those orthogonal axes than it is along the other. The result is that the resonator has two different resonant frequencies. The crystal thickness, $t$, the resonator length, L, and the difference in indices of refraction of the crystal must be such that there are an integral number of half wavelengths along each of the orthogonal axes. The ordinary axis of the crystal 9 is arbitrarily shown as in the direction of arrow 27 in FIG.

1 and is thus vertical or in the plane of the paper, and the extraordinary axis is shown as in the horizontal plane or perpendicular to the paper as indicated by the cross 29. In order to excite the two resonant modes or frequencies of the resonator equally, the input beam 16 must be either linearly polarized at an angle halfway between the two axes 27 and 29 of the crystal 9, or it must be circularly polarized. If an unpolarized input beam is utilized, a polarizer 15, shown in dashed lines, must be inserted and its axis adjusted so that only those rays which are polarized at 45 degrees, or halfway between the axes 27 and 29, will pass therethrough. The orientation of this polarizer 15 can be seen in FIG. 2 the parallel lines thereon indicating the polarization which is allowed to pass. The crystal 9 is coated with a known type of anti-reflection coating, indicated by the numeral 10.

Figure 5:
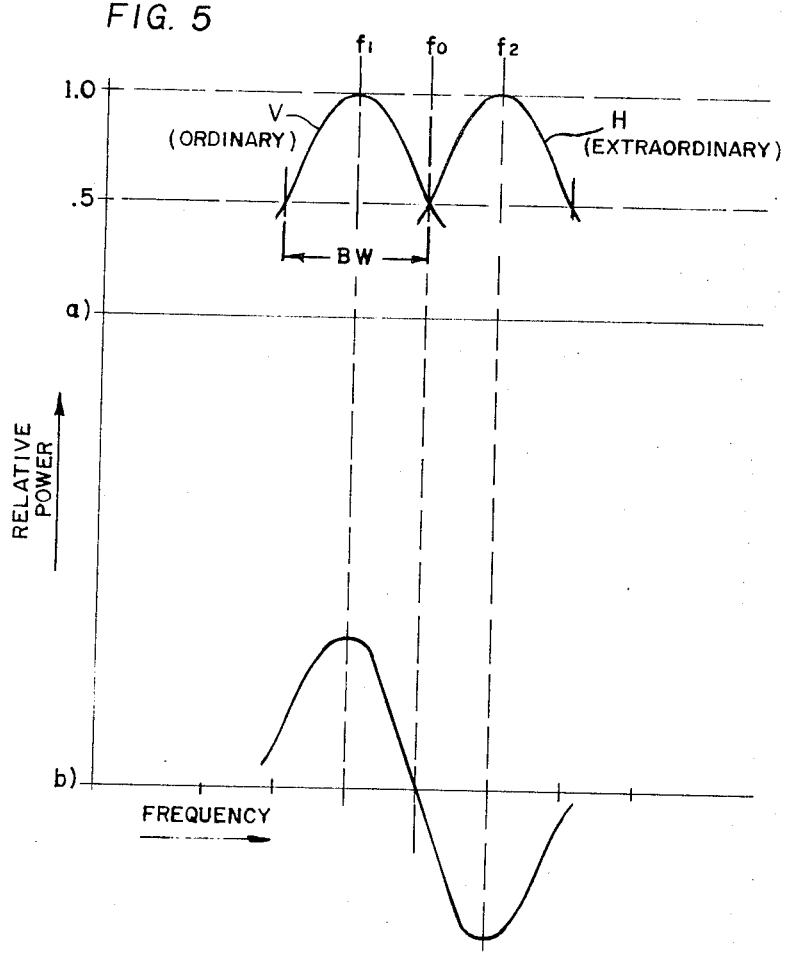
FIG. 5a illustrates the response curves of the two modes of the resonator 7, and FIG. 5b the resulting S-curve of the discriminator.

The resonator output beam 18 will comprise two orthogonal components, indicated at 31 and 33, which will have amplitudes which depend on the input optical frequency relative to the resonator tuning. FIG. 5a shows the frequency response curves along the ordinary or vertical axis (V) and along the extraordinary or horizontal axis (H). The peak of the vertical curve is at frequency $f_1$ and that of the horizontal curve $f_2$. The curves intersect half-way between these frequencies at $f_0$ in accordance with known discriminator design principles. Thus the half power bandwidths (BW) of each of the response curves is equaly to $f_2$ minus $f_1$. If the input optical frequency falls at or near $f_1$, the vertical component 31 in the resonator output will exceed that of the horizontal component 33, and if the input frequency is at or near $f_2$, the horizontal component will be the larger. An input frequency of $f_0$ will result in equal amplitudes for both resonant modes. The remainder of FIG. 1 comprises a means for separating the two components of the resonator output, converting each to a voltage and subtracting these voltages to yield the discriminator response curve of FIG. 5b. The beam splitter 17 of FIG. 1 may comprise a half silvered mirror set at 45 degrees to the resonator output beam 18. Thus the beam is split into two approximately equal parts travelling in different directions. A polarizer 20 has its axis oriented so that the horizontal component 33 passes therethrough and blocks the vertical component 31. A horizontal detector 21 which may comprise merely a photocell or multiplier converts the horizontal component into a voltage. Similarly, the polarizer 19 and vertical detector 23 are arranged to produce a voltage proportional to the vertical component 31. The difference amplifier 25 subtracts the output of detector 21 from that of detector 23 to produce the S-curve of FIG. 5b. The discriminator output may be applied to a meter which is calibrated directly in optical frequency or wavelength or if the device is part of an AFC system, the output would be fed back to control the frequency of the light source in such manner that the light source frequency approaches the center frequency, $f_0$, of the discriminator.

In the modification of FIG. 3 the birefringent crystal 43 and one of the spherical mirrors 41 forming one end of the resonator are combined into a single element. The crystal 43 has one convex side on which is deposited suitable material to form a mirror. The opposite flat surface of the crystal is coated with a nonreflective coating 10. This embodiment is easier to adjust, since it requires that only two elements be lined up rather than three.

In the modification of FIG. 4 a controllable electric field is applied to the birefringent crystal 9 transverse to the direction of light propagation therein by means of a DC voltage applied to the conductive electrodes 12 an 14, mounted on opposite sides of the crystal 9. The crystal thus becomes an electro-optic device with the result that the birefringent properties thereof are modified in accordance with the DC voltage applied thereto. The potentiometer 47 controls the percentage of the voltage of battery 45 applied to the crystal. By changing the voltage the relative indices of refraction of the two orthogonal axes of the crystal can be changed, thus changing both the tuning and bandwidth of the S-curve. Such a feature is valuable for experimental work.

The use of a single, dual-mode resonator reduces tracking problems which would occur with separate resonators, which might change dimensions slightly differently with temperature or vibration, thus upsetting the discriminator tuning. While the measurement of optical frequencies by interferometry has been known for many years, this prior art technique requires the manual adjustment of a micrometer plus the counting or observation of interference patterns (fringes) for each wavelength measurement. In contrast, the present invention provides at its output a voltage which continually varies as the input optical frequency changes, with the result that a fluctuating input frequency can be easily followed and measured.

The appended claims particularly point out and distinctly claim the subject matter which comprises the present invention and the scope of the invention must be measured by the language therein.

What is claimed is:

1. An optical frequency discriminator comprising, a single optical resonator of the beam waveguide type with a birefringent material therebetween, whereby said resonator possesses a different resonant frequency along each of two orthogonal axes, means to equally excite said modes with an input light beam of unknown frequency, said input light beam polarized such that a polarization component passes along each of said axes, and means to separate and compare the magnitude of said modes in the output of said resonator, the relative magnitudes of said modes being a measure of said input frequency relative to the two resonant frequencies of said resonator, thereby yielding an S-curve by which said unknown frequency may be measured.

2. The discriminator of claim 1, wherein said resonator comprises a pair of confronting spherical mirrors which are partially transparent and said birefringent material comprises a crystal mounted between said mirrors, and wherein said two orthogonal axes comprise the ordinary and extraordinary axes of said birefringent material.

3. The discriminator of claim 1, wherein said last-named means comprises a beam splitter for separating the output of said resonator into two parts and a polarizer in the path of each part for selectively passing a different component of said output resulting from a different one of said modes, and photodetector means for converting the light passed by said polarizers to voltages proportional thereto, and means to subtract one of said voltages from the other.

4. The discriminator of claim 1, wherein said modes are equally excited by applying a linearly polarized light beam to said resonator at an angle which is halfway between said orthogonal axes.

5. The discriminator of claim 2, wherein means are provided to set up a variable electric field within said crystal perpendicular to the direction of optical propagation therein, whereby said discriminator may be tuned.

6. The discriminator of claim 1, wherein said resonator comprises one spherical mirror and one confronting birefringent crystal, one side of which is convex and the opposite side flat, and wherein said convex side has reflective material coated thereon to form a second mirror.

References Cited

UNITED STATES PATENTS 3,213,393  10/1965  Powell et al. _____ 329—142X
3,283,261  11/1966  Buck _____ 329—137X (Other references on following page)

UNITED STATES PATENTS

| | | | |
|---|---|---|---|
| 3,314,017 | 4/1967 | Riblet | 329—137X |
| 3,324,295 | 6/1967 | Harris | 150—157X |
| 3,351,761 | 11/1967 | Hamby et al. | 350—150X |
| 3,404,353 | 10/1968 | Harris et al. | 350—150UX |
| 3,439,975 | 4/1969 | Smith | 350—150 |
| 3,443,858 | 5/1969 | LaRussa | 350—157 |

OTHER REFERENCES

Lotsch, "The Scalar Theory for Optical Resonators and Beam Waveguides," Optik, vol. 26, No. 2 (October 1967), pp. 112–118, relied on.

DAVID SCHOENBERG, Primary Examiner

R. R. MILLER, Assistant Examiner

U.S. Cl. X.R.

250—199; 350—150